(12) United States Patent
Kim et al.

(10) Patent No.: US 10,640,655 B2
(45) Date of Patent: May 5, 2020

(54) COMPOSITION FOR FORMING COATING LAYER HAVING SELF-HEALING PROPERTY, COATING LAYER, AND FILM

(71) Applicant: LG CHEM, LTD., Seoul (KR)

(72) Inventors: Heon Kim, Daejeon (KR); Yeong Rae Chang, Daejeon (KR); Hye Min Kim, Daejeon (KR); Eun Sang Yoo, Daejeon (KR); Young Suk Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 383 days.

(21) Appl. No.: 15/510,335

(22) PCT Filed: Nov. 30, 2015

(86) PCT No.: PCT/KR2015/012921
§ 371 (c)(1),
(2) Date: Mar. 10, 2017

(87) PCT Pub. No.: WO2016/089061
PCT Pub. Date: Jun. 9, 2016

(65) Prior Publication Data
US 2017/0306163 A1    Oct. 26, 2017

(30) Foreign Application Priority Data

Dec. 1, 2014  (KR) .................. 10-2014-0169892
Nov. 27, 2015 (KR) .................. 10-2015-0167372

(51) Int. Cl.
*C09D 4/06* (2006.01)
*C09D 7/61* (2018.01)
(Continued)

(52) U.S. Cl.
CPC .............. *C09D 4/06* (2013.01); *C08J 7/0427* (2020.01); *C09D 5/00* (2013.01); *C09D 7/61* (2018.01);
(Continued)

(58) Field of Classification Search
CPC .... C08J 7/047; C08J 2367/02; C08J 2451/08; C08J 2475/14; C09D 4/06; C09D 5/00; C09D 7/61; C09D 7/67; C08K 3/36
See application file for complete search history.

(56) References Cited

U.S. PATENT DOCUMENTS 8,426,027 B2   4/2013  Kawai et al.
8,975,308 B2   3/2015  Kim et al.
(Continued)

FOREIGN PATENT DOCUMENTS

CN   103804629 A    5/2014
JP   01-164437 A    6/1989
(Continued)

OTHER PUBLICATIONS

KR-20130102021-A Machine Translation (Year: 2013).*

*Primary Examiner* — Travis M Figg
(74) *Attorney, Agent, or Firm* — Dentons US LLP (57) ABSTRACT

The present invention relates to a composition for forming a coating layer having a self-healing property which enables the provision of a film exhibiting further improved mechanical properties together with excellent self-healing properties by being applied to the exterior of various household appliances or display devices, etc., a coating layer and a film. The composition for forming a coating layer having a self-healing property comprises: a poly($C_{2-4}$ alkylene glycol)-modified polyfunctional urethane (meth)acrylate-based binder; a bifunctional or higher polyfunctional (meth)acrylate-based compound; a UV initiator; and a silica nanoparticle, wherein the binder has a trifunctional or higher urethane bond and each poly($C_{2-4}$ alkylene glycol)-modified (meth)acrylate-based compound is bound to the urethane bond in the binder, and at least two poly($C_{2-4}$ alkylene glycol)-modified (meth)acrylate-based compounds bound to (Continued)

each urethane bond include poly($C_{2-4}$ alkylene glycol) repeating units whose numbers of repetitions are different from each other.

18 Claims, 1 Drawing Sheet

(51) Int. Cl.
  *C09D 7/40* (2018.01)
  *C08J 7/04* (2020.01)
  *C09D 5/00* (2006.01)
  *C08K 3/36* (2006.01)
(52) U.S. Cl.
  CPC .............. *C09D 7/67* (2018.01); *C08J 2367/02* (2013.01); *C08J 2451/08* (2013.01); *C08J 2475/14* (2013.01); *C08K 3/36* (2013.01)

(56) References Cited

U.S. PATENT DOCUMENTS

| | | | |
|---|---|---|---|
| 9,182,527 B2 | 11/2015 | Kobayashi et al. | |
| 2007/0166548 A1* | 7/2007 | Gruber | B29C 37/0025 428/411.1 |
| 2013/0071641 A1* | 3/2013 | DiBattista | B32B 7/12 428/216 |
| 2013/0261209 A1* | 10/2013 | Kim | C08G 18/672 522/33 |

FOREIGN PATENT DOCUMENTS

| | | |
|---|---|---|
| JP | 2005-162908 A | 6/2005 |
| JP | 2007-016215 A | 1/2007 |
| JP | 2011-219660 A | 11/2011 |
| JP | 2012-180847 A | 9/2012 |
| JP | 2013-184988 A | 9/2013 |
| JP | 5306699 B2 | 10/2013 |
| JP | 2014-505138 A | 2/2014 |
| JP | 2014-101444 A | 6/2014 |
| JP | 2014-111744 A | 6/2014 |
| JP | 5592120 B2 | 9/2014 |
| KR | 10-0371840 B1 | 2/2003 |
| KR | 10-2003-0056752 A | 7/2003 |
| KR | 10-0917393 B1 | 9/2009 |
| KR | 10-0927963 B1 | 11/2009 |
| KR | 10-0961940 B1 | 6/2010 |
| KR | 10-0972625 B1 | 7/2010 |
| KR | 10-2010-0114542 A | 10/2010 |
| KR | 10-2011-0050952 A | 5/2011 |
| KR | 10-2012-0093088 A | 8/2012 |
| KR | 10-1183517 B1 | 9/2012 |
| KR | 10-1251457 B1 | 4/2013 |
| KR | 10-2013-0102021 A | 9/2013 |
| KR | 20130102021 A * | 9/2013 |
| KR | 10-2014-0045961 A | 4/2014 |
| WO | 2014/103716 A1 | 7/2014 |
| WO | 2014/156813 A1 | 10/2014 |
| WO | 2014/156814 A1 | 10/2014 |

* cited by examiner

COMPOSITION FOR FORMING COATING LAYER HAVING SELF-HEALING PROPERTY, COATING LAYER, AND FILM

CROSS-REFERENCE TO RELATED APPLICATIONS

This application is a National Stage Application of International Application No. PCT/KR2015/012921 filed on Nov. 30, 2015, which claims priority to and the benefit of priority of Korean Patent Application Nos. 10-2014-0169892 filed on Dec. 1, 2014, and 10-2015-0167372 filed on Nov. 27, 2015, all of which are hereby incorporated by reference in their entirety for all purposes as if fully set forth herein.

TECHNICAL FIELD

The present invention relates to a composition for forming a coating layer having a self-healing property which enables the provision of a film exhibiting further improved mechanical properties together with excellent self-healing properties by being applied to the exterior of various molded products, a coating layer and a film.

BACKGROUND ART

In order to protect the products from damage due to mechanical, physical and chemical influences from the outside, various coating layers or coating films are being applied to the surface of electric and electronic devices such as mobile phones or various display devices, etc., components of electronic materials, household appliances, automobile interior and exterior materials, or various molded products such as various plastic products. However, scratches on the coated surface of the products or cracks due to external shocks deteriorate the appearance characteristic, main performance and lifespan of the products, and therefore various studies are being conducted to protect the surface of the products, thereby maintaining the quality of the products for a long period of time.

In particular, research and interest in coating materials having self-healing properties have been rapidly increasing in recent years. The self-healing property refers to a property in which, when scratches are made on the coating layer by an external physical force or stimulus applied to the coating layer, the damage such as scratches is gradually healed or reduced itself. Although various coating materials exhibiting such a self-healing property, or mechanisms of the self-healing property are known, in general, a method for using a coating material exhibiting elasticity is widely known. That is, when such a coating material is used, even if a physical damage such as scratches is applied on the coating layer, the damage site is gradually filled in because of the elasticity of the coating material itself, and thus, the self-healing property described above may be exhibited.

However, in the case of a conventional coating layer exhibiting the self-healing property, it had disadvantages in that the mechanical properties of the coating layer such as hardness, abrasion resistance or coating strength, etc. were insufficient as elastic materials were mainly included. In particular, in the case of applying a coating layer exhibiting a self-healing property to the exterior of various household appliances such as refrigerators or washing machines, etc., the mechanical properties of the coating layer are required on a high level, but in most cases, the coating layer having a conventional self-healing property could not satisfy such high mechanical properties. Accordingly, when a strong external stimulus was applied to the existing coating layer, there were many cases where the coating layer itself was permanently damaged, and the self-healing property was also lost.

Due to such problems of the prior arts, there has been a continuing demand for the development of a technique that enables the provision of a coating layer or film that exhibits further improved mechanical properties together with excellent self-healing properties.

CONTENTS OF THE INVENTION

Technical Problem

The present invention provides a composition for forming a coating layer having a self-healing property which enables the provision of a film exhibiting further improved mechanical properties together with excellent self-healing properties, by being applied to the exterior of various molded products.

Further, the present invention provides a coating layer having a self-healing property which is formed using the composition for forming a coating layer, and a film including the same.

Technical Solution

The present invention provides a composition for forming a coating layer having a self-healing property comprising: a poly($C_{2-4}$ alkylene glycol)-modified polyfunctional urethane (meth)acrylate-based binder; a bifunctional or higher polyfunctional (meth)acrylate-based compound; a UV initiator; and a silica nanoparticle, wherein the binder has a trifunctional or higher urethane bond and each poly($C_{2-4}$ alkylene glycol)-modified (meth)acrylate-based compound is bound to the urethane bond in the binder, and at least two poly($C_{2-4}$ alkylene glycol)-modified (meth)acrylate-based compounds bound to each urethane bond include poly($C_{2-4}$ alkylene glycol) repeating units whose numbers of repetitions are different from each other.

Further, the present invention provides a coating layer having a self-healing property comprising a binder layer in which a poly($C_{2-4}$ alkylene glycol)-modified polyfunctional urethane (meth)acrylate-based binder and a (meth)acrylate group of bifunctional or higher polyfunctional (meth)acrylate-based compound are bound to each other to form a cross-linked structure; and a silica nanoparticle dispersed in the cross-linked structure of the binder layer, wherein the binder layer has a cross-linking density of about 5 mol/kg to 10 mol/kg.

Furthermore, the present invention provides a film having a self-healing property comprising the coating layer having a self-healing property.

The film may further include a substrate layer supporting the coating layer, may further include a printing layer formed under the substrate layer and an adhesive layer formed under the printing layer, and may be adhered to the exterior of various molded products in the form.

Accordingly, the present invention also provides a molded product to which the film is adhered.

Hereinafter, the composition for forming a coating layer having a self-healing property, the coating layer and the film according to embodiments of the present invention will be described in more detail.

According to one embodiment of the present invention, there is provided a composition for forming a coating layer having a self-healing property comprising: a poly($C_{2-4}$ alkylene glycol)-modified polyfunctional urethane (meth)acrylate-based binder; a bifunctional or higher polyfunctional (meth)acrylate-based compound; a UV initiator; and a silica nanoparticle, wherein the binder has a trifunctional or higher urethane bond and each poly($C_{2-4}$ alkylene glycol)-modified (meth)acrylate-based compound is bound to the urethane bond, and at least two poly($C_{2-4}$ alkylene glycol)-modified (meth)acrylate-based compounds bound to each urethane bond include poly($C_{2-4}$ alkylene glycol) repeating units whose numbers of repetitions are different from each other.

The composition for forming a coating layer of the one embodiment include a poly($C_{2-4}$ alkylene glycol)-modified polyfunctional urethane (meth)acrylate-based binder, a bifunctional or higher polyfunctional (meth)acrylate-based compound and a silica nanoparticle, and the poly($C_{2-4}$ alkylene glycol)-modified polyfunctional urethane (meth)acrylate-based binder and polyfunctional (meth)acrylate-based compound are cured by UV irradiation to form a binder layer, whereas silica nanoparticles are dispersed on the thus-cured binder layer to form a coating layer having a self-healing property.

In the composition of the one embodiment, the poly($C_{2-4}$ alkylene glycol)-modified polyfunctional urethane (meth)acrylate-based binder is highly flexible and maintains a relatively high level of a manganese length of the cross-linked structure in the binder layer, and thus a high level of elasticity may be expressed in the binder layer and the coating layer including the binder layer. Due to the high level of elasticity, even if a damage such as scratches, etc. is made on the coating layer by an external physical stimulus, the damaged site is gradually filled in because of the elasticity, and thus the coating layer may exhibit excellent self-healing properties.

Furthermore, in the poly($C_{2-4}$ alkylene glycol)-modified polyfunctional urethane (meth)acrylate-based binder of the composition of the one embodiment, each poly($C_{2-4}$ alkylene glycol)-modified (meth)acrylate-based compound may be independently bound to a trifunctional or higher, for example three to six functional urethane bond, and at least two poly($C_{2-4}$ alkylene glycol)-modified (meth)acrylate-based compounds bound to each urethane bond may have poly($C_{2-4}$ alkylene glycol) repeating units having different repeating numbers (for example, two to four types of poly($C_{2-4}$ alkylene glycol)-modified (meth)acrylate-based compounds containing poly($C_{2-4}$ alkylene glycol) repeating units having different repeating numbers may be bound to the three to six functional urethane bond).

As will be described later, in accordance with the use of the binder exhibiting these properties, it was found that a coating layer exhibiting a self-healing property which has a cross-linking density of, for example, about 5 mol/kg to 10 mol/kg or about 5.5 mol/kg to 8.0 mol/kg and a glass transition temperature (Tg) of, for example, about 10 to 30° C. or about 12 to 25° C. could be formed by using the composition of the one embodiment. This is presumably because the degree of introduction of the cross-linked structure and the manganese length in the cross-linked structure may be optimized in the cured binder layer and the coating layer including the same, in accordance with the use of the binder exhibiting the properties described above.

Furthermore, it was found that the coating layer satisfying the cross-linking density and glass transition temperature described above may exhibit not only an excellent self-healing property, but also excellent mechanical properties such as hardness, abrasion resistance or coating strength, etc.

Accordingly, the coating layer having a self-healing property which is formed by using the composition of one embodiment and the film including the same may be highly preferably applied to the exterior of various household appliances such as refrigerators or washing machines, etc., or in the field of exterior molding of screen protection of display devices, exterior materials (for example, back cover for mobile phones, etc.) or various products.

The composition of the one embodiment will be described in more detail for each component as follow.

First, the composition of the one embodiment includes the poly($C_{2-4}$ alkylene glycol)-modified polyfunctional urethane (meth)acrylate-based binder. As described above, the binder may have a structure in which the poly($C_{2-4}$ alkylene glycol) modified (meth)acrylate-based compounds are independently bound via the trifunctional or higher, for example, the three to six functional urethane bond, and at least two poly($C_{2-4}$ alkylene glycol)-modified (meth)acrylate-based compounds bound to each urethane bond may include poly($C_{2-4}$ alkylene glycol) repeating units whose numbers of repetitions are different from each other.

More specific examples of the binder may include polyethylene glycol-modified polyfunctional (meth)acrylate-based binders or polypropylene glycol-modified polyfunctional (meth)acrylate-based binders, etc., and they may be used alone or in combination of two or more. More appropriately, in order to adjust the cross-linking density of the coating layer formed by the composition of one embodiment to an appropriate level and further improve the elongation and self-healing properties of the coating layer, the mixture of the polyethylene glycol-modified polyfunctional (meth)acrylate-based binder and polypropylene glycol-modified polyfunctional (meth)acrylate-based binder may be used.

In addition, as the binder, other known components exhibiting adequate elasticity may further be used. For example, as a polycarbonate-modified bifunctional urethane (meth)acrylate-based binder, which has a bifunctional or higher urethane bond and in which each polycarbonate-modified (meth)acrylate-based compound is bound to the urethane bond, is further used, the elongation and self-healing properties, etc. of the coating layer may be further improved.

The polycarbonate-modified bifunctional urethane (meth)acrylate-based binder may by prepared by carrying out a urethane reaction with a polycarbonate-modified (meth)acrylate-based compound and a diisocyanate compound to be described later in accordance with a known method in the art, or may be commercially obtained to be used.

On the other hand, the poly($C_{2-4}$ alkylene glycol) modified-polyfunctional urethane (meth)acrylate-based binder may be prepared by carrying out a urethane reaction with, for example, a trifunctional or higher polyvalent isocyanate-based compound, and at least two poly($C_{2-4}$ alkylene glycol)-modified (meth)acrylate-based compounds including poly($C_{2-4}$ alkylene glycol) repeating units whose numbers of repetitions are different from each other. As a result of the urethane reaction, as each isocyanate group of the polyvalent isocyanate-based compound and the hydroxyl group at the end of the poly($C_{2-4}$ alkylene glycol) repeating unit form an urethane bond, they are linked together to obtain the binder having the structure and properties described above.

The polyvalent isocyanate-based compound used to form the binder may be at least one selected from the group consisting of oligomers of diisocyanate compounds, polymers of diisocyanate compounds, cyclic polymers of diisocyanate compounds, hexamethylene diisocyanate isocyanurate, isophorone diisocyanate isocyanurate, toluene 2,6-diisocyanate isocyanurate, triisocyanate compounds and isomers thereof, and in addition, various trifunctional or higher polyvalent isocyanate compounds may be used to form the binder described above.

Further, among the specific examples of the polyvalent isocyanate-based compounds, the oligomers, polymers, cyclic polymers of diisocynate compounds, or isocyanurate may be formed from conventional aliphatic or aromatic diisocynate compounds, or commercially available oligomers of diisocyanate compounds and the like (for example, DN980S manufactured by Aekyung Chemical, which is a trimer of HDI) may be used. More specific examples of these diisocyanate compounds may include ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro 4,4'-diphenylmethane diisocyanate, 1,3-phenylene diisocyanate, 1,4-phenylene diisocyanate, 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), isophorone diisocyanate (IPDI) and the like.

Furthermore, the at least two poly($C_{2-4}$ alkylene glycol)-modified (meth)acrylate-based compounds used to form the binder may each have a number-average molecular weight of about 200 to 1000 or about 250 to 800, and may each include poly($C_{2-4}$ alkylene glycol) repeating units whose numbers of repetitions are 2 to 10 or 4 to 6. In addition, each of the poly($C_{2-4}$ alkylene glycol) modified-(meth)acrylate-based compounds may include poly($C_{2-4}$ alkylene glycol) repeating units whose numbers of repetitions are different from each other within the range described above and accordingly may have different molecular weight. In a more specific example, as the poly($C_{2-4}$ alkylene glycol)-modified (meth)acrylate-based compounds, at least one first compound, which has a number-average molecular weight of about 200 to 500 or about 200 to 400, and a poly($C_{2-4}$ alkylene glycol) repeating unit whose numbers of repetitions correspond thereto, and at least one second compound, which has a number-average molecular weight of about 400 to 1000 or about 500 to 800, and a poly($C_{2-4}$ alkylene glycol) repeating unit whose numbers of repetitions correspond thereto may each be used. Herein, the first and second compounds include the poly($C_{2-4}$ alkylene glycol) repeating units whose numbers of repetitions are different from each other and accordingly have different number-average molecular weights as already described.

Accordingly, as the degree of introduction of the cross-linked structure and the manganese length in the cross-linked structure in the cured binder layer and the coating layer may be further optimized, it is possible to more effectively form the coating layer having a self-healing property which exhibits the cross-linking density and glass transition temperature described above by using the composition of one embodiment. As a result, it is possible to appropriately form the coating layer having a self-healing property which exhibits further improved self-healing properties and mechanical properties.

On the other hand, the reaction for forming the binder described above may be carried out under a conventional urethane reaction condition. For example, the urethane reaction may be carried out by stirring at about 20 to 100° C. for about 1 to 10 hours, and may be carried out in the presence of a metal-containing catalyst such as tin including DBTDL (dibutyl tin dilaurate).

The composition for forming a coating layer having a self-healing property of one embodiment may include a bifunctional or higher, more appropriately, a trifunctional or higher polyfunctional (meth)acrylate-based compound. The compound may form a cross-linked structure with the binder described above to form a binder layer, and may serve to further improve the mechanical properties of the cured binder layer and the coating layer including the same.

As for the polyfunctional (meth)acrylate-based compound, any bifunctional or higher, or trifunctional or higher, for example, three to six functional polyfunctional (meth)acrylate-based compounds may all be used without specific limitations. Specific examples of the polyfunctional (meth)acrylate-based compound may include at least one selected from the group consisting of polyfunctional urethane acrylate, 9-ethylene glycol diacrylate (9-EGDA), bisphenol A epoxy acrylate, polyether triacrylate, pentaerythritol tri/tetraacrylate (PETA), dipentaerythritol hexa-acrylate (DPHA), trimethylolpropane triacrylate (TMPTA), and hexamethylene diacrylate (HDDA).

In addition, the composition of the one embodiment may include a UV initiator, and the UV initiator can be used without specific limitations as long as it is a compound known to be commonly used in the art. Specific examples of the UV initiator may include benzophenone-based compounds, acetophenone-based compounds, nonimidazole-based compounds, triazine-based compounds, oxime-based compounds, or mixtures thereof, and more specific examples thereof may include benzophenone, benzoyl methyl benzoate, acetophenone, 2,4-diehtyl thioxanthone, 2-chloro thioxanthone, ethyl anthraquinone, 1-hydroxy-cyclohexyl-phenyl-ketone (Irgacure 184 manufactured by Ciba as a commercially available product) or 2-hydroxy-2-methyl-1-phenyl-propan-1-one, etc.

On the other hand, the composition of one embodiment may include silica nanoparticles, and these components may be uniformly dispersed in the cured binder layer, thereby serving to further improve the mechanical properties of the coating layer having a self-healing property. The silica nanoparticles may have a particle size of about 5 to 50 nm or about 10 to 40 nm in view of not deteriorating the transparency of the coating layer, while appropriately improving the mechanical properties of the coating layer, etc.

The composition of one embodiment may further include at least one additive selected from the group consisting of organic solvents for dissolving or dispersing the components; or surfactants, leveling agents and dispersion stabilizers, in addition to the respective components described above.

As the organic solvents, any organic solvents may be used without specific limitations as long as they are known in the art to be used in coating compositions. For example, ketone-based organic solvents such as methyl isobutyl ketone, methyl ethyl ketone, dimethyl ketone, etc.; alcohol organic solvents such as isopropyl alcohol, isobutyl alcohol or normal butyl alcohol, etc.; acetate organic solvents such as ethyl acetate or normal butyl acetate, etc.; cellosolve organic solvents such as ethyl cellosolve or butyl cellosolve, etc. may be used. However, the organic solvents are not limited to the examples described above.

In addition, the additives such as surfactants, leveling agents, and dispersion stabilizers may all be used without specific limitations, either by manufacturing or commercially obtaining components known to be used for compositions for forming a coating layer.

On the other hand, the composition for forming a coating layer having a self-healing property described above may include a composition for forming a binder including about 50 to 90% by weight or about 60 to 88% by weight of poly($C_{2-4}$ alkylene glycol)-modified polyfunctional (meth)acrylate-based binder, about 5 to 45% by weight or about 7 to 30% by weight of bifunctional or higher polyfunctional (meth)acrylate-based compound and about 1 to 10% by weight or about 3 to 8% by weight of the silica nanoparticle; and a UV initiator in an amount of 0.1 to 5 parts by weight or about 1 to 3 parts by weight based on 100 parts by weight of the composition for forming a binder.

Further, the composition of the one embodiment may further include about 0.5 to 10 parts by weight of additives and about 10 to 50 parts by weight of organic solvents based on 100 parts by weight of the composition for forming a binder.

As the composition of the one embodiment described above includes each component in the content range described above, it is possible to more effectively form the coating layer having a self-healing property which exhibits the cross-linking density and glass transition temperature already described. As a result, it is possible to appropriately form the coating layer having a self-healing property which exhibit further improved self-healing properties and mechanical properties.

On the other hand, according to another embodiment of the present invention, there is provided a coating layer having a self-healing property obtained by subjecting the composition of the one embodiment of the one embodiment described above to UV curing. The coating layer having a self-healing property of another embodiment may include a binder layer in which a poly($C_{2-4}$ alkylene glycol)-modified polyfunctional urethane (meth)acrylate-based binder and a (meth)acrylate group of bifunctional or higher polyfunctional (meth)acrylate-based compound are bound to each other to form a cross-linked structure; and a silica nanoparticle dispersed in the cross-linked structure of the binder layer, wherein the binder layer may have a cross-linking density of about 5 mol/kg to 10 mol/kg. In a more appropriate example, the binder layer and the coating layer including the same of another embodiment may have a glass transition temperature (Tg) of about 10 to 30° C.

As already described, the composition of one embodiment may include the poly($C_{2-4}$ alkylene glycol)-modified polyfunctional urethane (meth)acrylate-based binder satisfying the specific structural properties (that is, the polycarbonate-modified (meth)acrylate-based compounds are each bound via the trifunctional or higher urethane bond, and at least two poly($C_{2-4}$ alkylene glycol)-modified polyfunctional (meth)acrylate-based compounds bound to each urethane bond include poly(alkylene glycol) repeating units whose numbers of repetitions are different from each other), together with other components. The coating layer of another embodiment formed from the composition of one embodiment including the binder may have a cross-link density of, for example, about 5 to 10 mol/kg or about 5.5 to 8.0 mol/kg, and a glass transition temperature (Tg) of, for example, about 10 to 30° C. or about 12 to 25° C. By satisfying these properties, excellent mechanical properties such as hardness, abrasion resistance and coating strength, etc. may be exhibited together with excellent self-healing properties.

Therefore, the coating layer having a self-healing property and the film including the same may be highly preferably applied to the exterior of various household appliances such as refrigerators or washing machines, etc., or to the exterior of various molded products such as screen protection of mobile phones or display devices, exterior materials (for example, back cover for mobile phones, etc.), various automobile interior materials or various plastic products.

On the other hand, in the coating layer of another embodiment, a small trace of residual UV initiator, residual organic solvent, or additives, etc. may further exist in a state of being dispersed in the binder layer. However, all or almost of these components may be substantially removed in the course of curing and forming the coating layer having the self-healing property.

Further, the coating layer may be exclusively in the form of a film, but may also be in the form of a layer formed by coating onto a predetermined substrate layer to be described later, or a laminated film laminated/formed on a substrate layer.

On the other hand, the coating layer of another embodiment described above may be formed by the method of mixing each component to form the composition of one embodiment, applying the composition to the substrate layer, drying and subjecting the dried composition to UV curing. Herein, in the case of forming the coating layer exclusively into a film, the coating layer may be separated from the substrate layer after the UV curing using a release film to obtain the coating layer in the form of a film.

In the method for forming a coating layer, in the step of mixing each component, the components may be uniformly mixed by using a stirring device or mixing method known to be commonly used for mixing organic compounds to obtain the composition of one embodiment.

In addition, in the step of applying the composition of the one embodiment onto the substrate layer, a conventional coating method, for example, the Meyer bar coating method, applicator coating method, roll coating method, etc. may all be used without particular limitations to apply the composition onto the substrate layer. Then, all organic solvents contained in the composition may be substantially removed by drying at about 20 to 80° C. for about 1 to 30 minutes.

Thereafter, in the subsequent UV curing step, the composition on the substrate layer may be subjected to UV curing by irradiating UV (for example, ultraviolet rays having a wavelength of about 200 to 400 nm) with an intensity of about 50 to 2000 mJ/cm$^2$, and accordingly, the coating layer having a self-healing property according to another embodiment may be formed.

On the other hand, according to still another embodiment of the present invention, there is provided a film having a self-healing property including the coating layer of another embodiment described above. As already described, the film may be in the form of a single-layer film only including the coating layer described above, but may be in the form of a laminated layer further including the substrate layer supporting the coating layer, etc.

In the film, the substrate layer may be composed of various materials, such as glass, metal or resin, etc., but more appropriately, it may be in the form of a resin substrate layer or resin substrate film. The resin substrate layer or resin substrate film may include polymer resins including polycarbonate-based resins, polyester-based resins such as polyethylene terephthalate resin (PET resin), polyolefin-based resins such as PE or PP, poly(meth)acrylate-based resins such as PMMA, cellulose-based resins such as TAC, polyimide-based resins, or cyclic olefin-based resins such as COC or COP, etc.

By forming the coating layer of another embodiment having a self-healing property on the substrate layer according to the method described above (or by separating the coating layer from the substrate layer after forming the coating layer), the film according to still another embodiment may be obtained. As the film includes the coating layer exhibiting excellent mechanical properties together with self-healing properties, the film may be highly preferably applied to the exterior of various household appliances such as refrigerators and washing machines or decorative molded products, or to the exterior of various molded products such as screen protection of mobile phones or display devices, exterior materials, various automobile interior materials or various plastic products, etc.

In a more specific example of the film, the substrate layer may have a thickness of about 50 to 400 μm or about 70 to 400 μm or about 100 to 300 μm, and the coating layer may have a thickness of about 10 to 100 μm or about 15 to 50 μm. Accordingly, the film may exhibit appropriate mechanical properties, and thus be preferably adhered and applied to the exterior of household appliances and the like.

On the other hand, the film of still another embodiment described above may further include a protective film layer formed on the coating layer and a cohesive layer formed between the coating layer and protective film layer. The protective film layer may be laminated by using all PET films, etc., which are commonly known to be used as a release film, etc. without particular limitations. In order to adhere the protective film layer on the coating layer having the self-healing property, the appropriate cohesive layer may be applied. The cohesive layer may have a thickness of about 5 to 50 μm or about 10 to 30 μm.

The film of still another embodiment above may be supplied in a form in which the protective film layer is adhered to the coating layer, for example, to a manufacturer of household appliances, etc., and when the film is applied to the exterior of household appliances, the protective layer film and adhesive layer may be removed.

Further, the film may further include a printing layer formed under the substrate layer and an adhesive layer formed under the printing layer, and may be adhered to the exterior of molded products such as various household appliances, etc. in the form. Herein, various patterns for providing a beautiful appearance for the household electric appliances, etc. may be printed on the printing layer.

The film described above may be applied by adhering to the exterior of various household appliances such as refrigerators or washing machines, decorative molded products or automobile interior materials, or may be applied by adhering to the exterior of mobile phones or display devices. In a more specific example, it may be preferably applied to the exterior of various molded products such as exterior materials for protecting screens of mobile phones or display devices (for example, back cover) or various plastic products. Thus, even when a damage such as scratches, etc. is made by an external stimulus, it exhibits excellent self-healing properties which heal itself, and also exhibit excellent mechanical properties. Therefore, it may play a role in protecting the exterior of various molded products such as various household appliances, display devices, automobile interior materials or mobile phones, etc.

Advantageous Effects

According to the present invention, there may be provided a coating layer having a self-healing property which exhibits further improved mechanical properties such as hardness, abrasion resistance or coating strength, etc., together with excellent self-healing properties, and a film including the same, etc.

Accordingly, the coating layer and the film including the same may be highly preferably applied to the exterior of various household appliances such as refrigerators or washing machines, etc. or decorative molded products, or to the exterior of various molded products such as screen protection of mobile phones or display devices or automobile interior materials, etc.

DETAILED DESCRIPTION OF THE EMBODIMENTS

Hereinafter, the present invention will be described in more detail by way of Examples. However, these Examples are given for illustrative purposes only, and the scope of the invention is not intended to be limited by these Examples.

Preparation Example 1: Preparation of Polyethylene Glycol-Modified Polyfunctional Urethane (Meth)Acrylate-Based Binder DN980S manufactured by Aekyung Chemical, which is an HDI-based trimer, was used as a trifunctional or higher polyvalent isocyanate-based compound, and as the polyethylene glycol-modified (meth)acrylate-based compounds, a polyethylene glycol monoacrylate (Mn=300) and a polyethylene glycol monoacrylate (Mn=500) having different number-average molecular weights by including polyethylene glycol repeating units having different repeating numbers were each used.

40 g of polyvalent isocyanate-based compound, 30 g of polyethylene glycol monoacrylate (Mn=300) and 30 g of polyethylene glycol monoacrylate (Mn=500) were mixed with 0.1 g of DBTDL (dibutyl tin dilaurate) and 200 g of methyl ethyl ketone, and the mixture was stirred at 60° C. for about 5 hours to carry out a urethane reaction.

Figure 1:
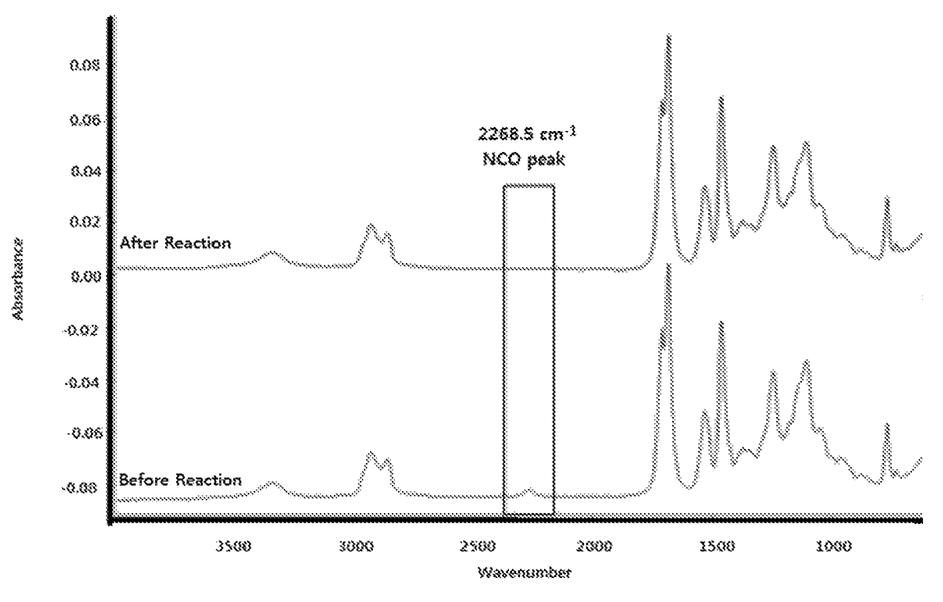
FIG. 1 shows a graph comparing the FT-IR spectra before and after the progress of the urethane reaction for the production of the polyethylene glycol-modified polyfunctional urethane (meth)acrylate-based binder in Preparation Example 1.

By the completion of the urethane reaction, the polyethylene glycol-modified polyfunctional urethane (meth)acrylate-based binder of Preparation Example 1 was prepared. The progress of the urethane reaction and the formation of the binder were confirmed via FT-IR. For reference, the FT-IR spectra before and after the urethane reaction are shown in FIG. 1. With reference to FIG. 1, it was confirmed that the peak derived from the isocyanate group (—NCO) appearing at the position of about 2268.5 cm$^{-1}$ disappeared, thereby confirming the progress of the urethane reaction and the formation of the binder.

Preparation Example 2: Preparation of Polypropylene Glycol-Modified Polyfunctional Urethane (Meth)Acrylate-Based Binder DN980S manufactured by Aekyung Chemical, which is an HDI-based trimer, was used as a trifunctional or higher polyvalent isocyanate-based compound, and as the polypropylene glycol-modified (meth)acrylate-based compounds, a polypropylene glycol monoacrylate (Mn=400) and a polypropylene glycol monoacrylate (Mn=600) having a different number-average molecular weight by including polypropylene glycol repeating units having different repeating numbers were each used.

40 g of polyvalent isocyanate compound, 40 g of polypropylene glycol monoacrylate (Mn=400) and 40 g of polypropylene glycol monoacrylate (Mn=600) were mixed with 0.15 g of DBTDL (dibutyl tin dilaurate) and 300 g of methyl ethyl ketone, and the mixture was stirred at 60° C. for about 5 hours to carry out a urethane reaction.

By the completion of the urethane reaction, the polypropylene glycol-modified polyfunctional urethane (meth)acrylate-based binder of Preparation Example 2 was prepared. The progress of the urethane reaction and the formation of the binder were confirmed by the disappearance of the peak derived from the isocyanate group (—NCO) appearing at about 2268.5 $cm^{-1}$ via FT-IR as in Preparation Example 1.

Comparative Preparation Example 1: Preparation of Polyethylene Glycol-Modified Polyfunctional Urethane (Meth)Acrylate-Based Binder The polyethylene glycol-modified polyfunctional urethane (meth)acrylate-based binder was prepared in the same manner as in Preparation Example 1, except that only 60 g of polyethylene glycol monoacrylate (Mn=500) was used without using the polyethylene glycol monoacrylate (Mn=300) in Preparation Example 1. The progress of the urethane reaction and the formation of the binder were confirmed via FT-IR.

Comparative Preparation Example 2: Preparation of Polyethylene Glycol-Modified Polyfunctional Urethane (Meth)Acrylate-Based Binder The polyethylene glycol-modified polyfunctional urethane (meth)acrylate-based binder was prepared in the same manner as in Preparation Example 1, except that a bifunctional HDI (diisocyanate compound) was used instead of using the DN980S manufactured by Aekyung Chemical, which is a HDI-based trimer, in Preparation Example 1. The progress of the urethane reaction and the formation of the binder were confirmed via FT-IR.

Examples 1 and 2: Preparation of Compositions for Forming Coating Layer Having Self-Healing Property The polyethylene glycol-modified polyfunctional urethane (meth)acrylate-based binder obtained in Preparation Example 1, pentaerythritol triacrylate (PETA), as a bifunctional or higher polyfunctional (meth)acrylate-based compound, and silica nanoparticles having a particle size of 30 nm were mixed in the amounts shown in Table 1 below to form a composition for forming a binder.

The compositions of Examples 1 and 2 were prepared by mixing 2 parts by weight of UV initiator (Irgacure 184), 1 part by weight of leveling agent and 35 parts by weight of methyl ethyl ketone based on 100 parts by weight of the composition for forming a binder.

Example 3: Preparation of Composition for Forming Coating Layer Having Self-Healing Property The polypropylene glycol-modified polyfunctional urethane (meth)acrylate-based binder obtained in Preparation Example 2, pentaerythritol triacrylate (PETA), as a bifunctional or higher polyfunctional (meth)acrylate-based compound, and silica nanoparticles having a particle size of 30 nm were mixed in the amounts shown in Table 1 below to form a composition for forming a binder.

The composition of Example 3 was prepared by mixing 2 parts by weight of UV initiator (Irgacure 184), 1 part by weight of leveling agent and 35 parts by weight of methyl ethyl ketone based on 100 parts by weight of the composition for forming a binder.

Example 4: Preparation of Composition for Forming Coating Layer Having Self-Healing Property The polyethylene glycol-modified polyfunctional urethane (meth)acrylate-based binder and the polypropylene glycol-modified polyfunctional urethane (meth)acrylate-based binder obtained in Preparation Examples 1 and 2, respectively, pentaerythritol triacrylate (PETA), as a bifunctional or higher polyfunctional (meth)acrylate-based compound, and silica nanoparticles having a particle size of 30 nm were mixed in the amounts shown in Table 1 below to form a composition for forming a binder.

The composition of Example 4 was prepared by mixing 2 parts by weight of UV initiator (Irgacure 184), 1 part by weight of leveling agent and 35 parts by weight of methyl ethyl ketone based on 100 parts by weight of the composition for forming a binder.

Example 5: Preparation of Composition for Forming Coating Layer Having Self-Healing Property The polyethylene glycol-modified polyfunctional urethane (meth)acrylate-based binder obtained in Preparation Example 1, dipentaerythritol hexa-acrylate (DPHA), as a bifunctional or higher polyfunctional (meth)acrylate-based compound, and silica nanoparticles having a particle size of 30 nm were mixed in the amounts shown in Table 1 below to form a composition for forming a binder.

The composition of Example 5 was prepared by mixing 2 parts by weight of UV initiator (Irgacure 184), 1 part by weight of leveling agent and 35 parts by weight of methyl ethyl ketone based on 100 parts by weight of the composition for forming a binder Comparative Examples 1 and 2: Preparation of Compositions for Forming Coating Layer Having Self-Healing Property The binders of Comparative Examples 1 and 2 were each prepared in the same manner as in Example 1, except that the binders obtained in Comparative Preparation Examples 1 and 2 were used instead of the binder of Preparation Example 1, in Example 1.

TABLE 1

Specific compositions of Examples 1 to 5 and Comparative Examples 1 and 2

|  | Types of binder | Content of binder (wt %; based on the content of the composition for forming a binder) | Content of PETA (wt %; based on the content of the composition for forming a binder) | Content of DPHA (wt %; based on the content of the composition for forming a binder) | Content of silica nanoparticles (wt %; based on the content of the composition for forming a binder) |
|---|---|---|---|---|---|
| Example 1 | Preparation Example 1 | 85 | 10 |  | 5 |
| Example 2 | Preparation Example 1 | 75 | 20 |  | 5 |
| Example 3 | Preparation Example 2 | 75 | 20 |  | 5 |
| Example 4 | Preparation Example 1 + Preparation Example 2 | 35 + 35 | 25 |  | 5 |
| Example 5 | Preparation Example 1 | 75 |  | 20 | 5 |
| Comparative Example 1 | Comparative Preparation Example 1 | 85 | 10 |  | 5 |
| Comparative Example 2 | Comparative Preparation Example 2 | 85 | 10 |  | 5 |

Experimental Example: Formation of Coating Layer and Film, and Evaluation of Physical Properties The compositions obtained in Examples 1 to 5 and Comparative Examples 1 and 2 were each coated onto a PET film with a meyer bar No. 40, then dried in an oven at 60° C. for 2 minutes, and irradiated with ultraviolet rays with an intensity of 100 mJ/cm$^2$ to form coating layers having a self-healing property and films independently.

The physical properties of the coating layers were measured and evaluated in the following manner.

1. Cross-Linking Density:

The cross-linking density was measured and evaluated by swelling the coating layer according to the Flory-Rehner equation. More specifically, after measuring the initial mass (Mi) of the coating layer sample (sample size: 2 cm in width, 7 cm in length and 100 μm in thickness), the sample was immersed in 50 ml of toluene solvent for 168 hours and then taken out to measure the final mass (Mf) of the swelled sample. From the initial and final masses, the change in mass was calculated by the equation of $\Delta M = Mf - Mi$. The volume change percentage of the swelled coating layer sample was calculated from the change in mass ($\Delta M$), and the calculated value was introduced to the Flory-Rehner equation to finally calculate the cross-linking density.

2. Tg:

The glass transition temperature of the coating layers was measured by using DSC.

3. Self-Healing Property:

The surface of the coating layer was rubbed 30 times back and forth with a copper brush having a load of 750 g, and then the time at which the scratch was healed at room temperature was visually confirmed and measured.

4. Pencil Hardness:

The pencil hardness of the coating layer was measured according to JIS K5400 with a load of 500 g.

5. Measurement of Scratch Resistance:

The steel wool (#0000) was rubbed 10 times back and forth with a constant load, and then the occurrence of scratches on the surface of the coating layer was visually observed. By repeating the measurements with increasing the load, the scratch resistance was evaluated at the maximum load immediately before the occurrence of scratches. The results of the physical properties measured above are summarized in Table 2 below.

TABLE 2

Evaluation results of the physical properties of Examples 1 to 3 and Comparative Examples 1 and 2

|  | Example 1 | Example 2 | Example 3 | Example 4 | Example 5 | Comparative Example 1 | Comparative Example 2 |
|---|---|---|---|---|---|---|---|
| Cross-linking density (mol/kg) | 5.55 | 5.96 | 6.62 | 6.23 | 9.10 | 3.25 | 1.20 |
| Tg (° C.) | 13 | 17 | 23 | 21 | 35 | 10 | −10 |
| Self-healing property | <1 second | 75 seconds | 10 seconds | 15 seconds | 120 seconds | Not healed | Not healed |
| Pencil hardness | B | HB | HB | HB | HB | 2B | 2B |
| Scratch resistance | 200 g OK | 300 g OK | 300 g OK | 300 g OK | 300 g OK | 100 g OK | 50 g OK |

With reference to Table 1, it was confirmed that the coating layers of Examples 1 to 5 satisfying the predetermined ranges of cross-linking density and Tg also exhibited excellent mechanical properties such as hardness and scratch resistance, etc., while exhibiting excellent self-healing properties. In contrast, it was confirmed that the coating layers of Comparative Examples 1 and 2 not only could not exhibit the self-healing properties, but also showed poor mechanical properties such as hardness and scratch resistance, etc.

The invention claimed is:

1. A composition for forming a coating layer having a self-healing property comprising:
   a poly($C_{2-4}$ alkylene glycol)-modified polyfunctional urethane (meth)acrylate-based binder;
   a bifunctional or higher polyfunctional (meth)acrylate-based compound;
   a UV initiator;
   a polycarbonate-modified bifunctional urethane (meth)acrylate-based binder which has a bifunctional urethane bond and each polycarbonate-modified (meth)acrylate-based compound is bound to the urethane bond in the polycarbonate-modified bifunctional urethane (meth)acrylate-based binder; and
   a silica nanoparticle which is dispersed in a cross-linked structure of the binder when the binder is in a cured state by UV irradiation,
   wherein the poly($C_{2-4}$ alkylene glycol)-modified polyfunctional urethane (meth)acrylate-based binder has a trifunctional or higher urethane bond and each poly($C_{2-4}$ alkylene glycol)-modified (meth)acrylate-based compound is bound to the urethane bond in the poly($C_{2-4}$ alkylene glycol)-modified polyfunctional urethane (meth)acrylate-based binder, and
   at least two poly($C_{2-4}$ alkylene glycol)-modified (meth)acrylate-based compounds bound to each urethane bond include poly($C_{2-4}$ alkylene glycol) repeating units whose numbers of repetitions are different from each other.

2. The composition for forming a coating layer having a self-healing property of claim 1, wherein the poly($C_{2-4}$ alkylene glycol)-modified polyfunctional urethane (meth)acrylate-based binder includes at least one selected from the group consisting of polyethylene glycol-modified polyfunctional urethane (meth)acrylate-based binders and polypropylene glycol-modified polyfunctional urethane (meth)acrylate-based binders.

3. The composition for forming a coating layer having a self-healing property of claim 1, wherein the poly($C_{2-4}$ alkylene glycol)-modified polyfunctional urethane (meth)acrylate-based binder is formed by reacting a trifunctional or higher polyvalent isocyanate-based compound with at least two poly($C_{2-4}$ alkylene glycol)-modified polyfunctional (meth)acrylate-based compounds containing poly(alkylene glycol) repeating units whose numbers of repetitions are different from each other.

4. The composition for forming a coating layer having a self-healing property of claim 3, wherein the polyvalent isocyanate-based compound is selected from the group consisting of oligomers of diisocyanate compounds, polymers of diisocyanate compounds, cyclic polymers of diisocyanate compounds, hexamethylene diisocyanate isocyanurate, isophorone diisocyanate isocyanurate, toluene 2,6-diisocyanate isocyanurate, triisocyanate compounds and isomers thereof.

5. The composition for forming a coating layer having a self-healing property of claim 3, wherein each of the at least two poly($C_{2-4}$ alkylene glycol)-modified polyfunctional (meth)acrylate-based compounds have a number-average molecular weight of 200 to 1000.

6. The composition for forming a coating layer having a self-healing property of claim 5, wherein the at least two poly($C_{2-4}$ alkylene glycol)-modified polyfunctional (meth)acrylate-based compounds include at least one first compound having a number-average molecular weight of 200 to 500 and at least one second compound having a number-average molecular weight of 400 to 1000,
   wherein the first and second compounds include poly($C_{2-4}$ alkylene glycol) repeating units having different repeating numbers and have different number-average molecular weights.

7. The composition for forming a coating layer having a self-healing property of claim 1, wherein the bifunctional or higher polyfunctional (meth)acrylate-based compound is selected from the group consisting of polyfunctional urethane acrylate, 9-ethylene glycol diacrylate (9-EGDA), bisphenol A epoxy acrylate, polyether triacrylate, pentaerythritol tri/tetraacrylate (PETA), dipentaerythritol hexa-acrylate (DPHA), trimethylolpropane triacrylate (TMPTA), and hexamethylene diacrylate (HDDA).

8. The composition for forming a coating layer having a self-healing property of claim 1, wherein the silica nanoparticle has a particle diameter of 5 to 50 nm.

9. The composition for forming a coating layer having a self-healing property of claim 1, comprising a composition for forming a binder comprising
   50 to 90% by weight of the poly($C_{2-4}$ alkylene glycol)-modified polyfunctional urethane (meth)acrylate-based binder,
   5 to 45% by weight of the bifunctional or higher polyfunctional (meth)acrylate-based compound, and
   1 to 10% by weight of the silica nanoparticle; and
   0.1 to 5 parts by weight of the UV initiator based on 100 parts by weight of the composition for forming a binder.

10. A coating layer having a self-healing property comprising a binder layer in which a poly($C_{2-4}$ alkylene glycol)-modified polyfunctional urethane (meth)acrylate-based binder and a (meth)acrylate group of bifunctional or higher polyfunctional (meth)acrylate-based compound are bound to each other to form a cross-linked structure;
   a polycarbonate-modified bifunctional urethane (meth)acrylate-based binder which has a bifunctional urethane bond and each polycarbonate-modified (meth)acrylate-based compound is bound to the urethane bond in the polycarbonate-modified bifunctional urethane (meth)acrylate-based binder; and
   a silica nanoparticle dispersed in the cross-linked structure of the binder layer,
   wherein the binder layer has a cross-linking density of 5 mol/kg to 10 mol/kg,
   wherein the poly($C_{2-4}$ alkylene glycol)-modified polyfunctional urethane (meth)acrylate-based binder has a trifunctional or higher urethane bond and each poly($C_{2-4}$ alkylene glycol)-modified (meth)acrylate-based compound is bound to the urethane bond in the poly($C_{2-4}$ alkylene glycol)-modified polyfunctional urethane (meth)acrylate-based binder, and
   at least two poly($C_{2-4}$ alkylene glycol)-modified (meth)acrylate-based compounds bound to each urethane bond include poly($C_{2-4}$ alkylene glycol) repeating units whose numbers of repetitions are different from each other.

11. The coating layer having a self-healing property of claim 10, having a glass transition temperature of 10 to 30° C.

12. A film having a self-healing property comprising the coating layer having a self-healing property of claim 10.

13. The film having a self-healing property of claim 12, further comprising a substrate layer supporting the coating layer.

14. The film having a self-healing property of claim 13, wherein the substrate layer has a thickness of 50 to 400 μm, and the coating layer has a thickness of 10 to 100 μm.

15. The film having a self-healing property of claim 12, further comprising a protective film layer formed on the coating layer and a cohesive layer formed between the coating layer and the protective film layer.

16. The film having a self-healing property of claim 13, further comprising a printing layer formed under the substrate layer and an adhesive layer formed under the printing layer.

17. A molded product to which the film of claim 12 is adhered.

18. The molded product of claim 17, which is a household appliance, mobile phone, automobile interior material or display device.

* * * * *